W. N. CORBIT.
WIRELESS CHECK ROWER.
APPLICATION FILED OCT. 12, 1910.
1,029,595.
Patented June 18, 1912.
2 SHEETS—SHEET 1.
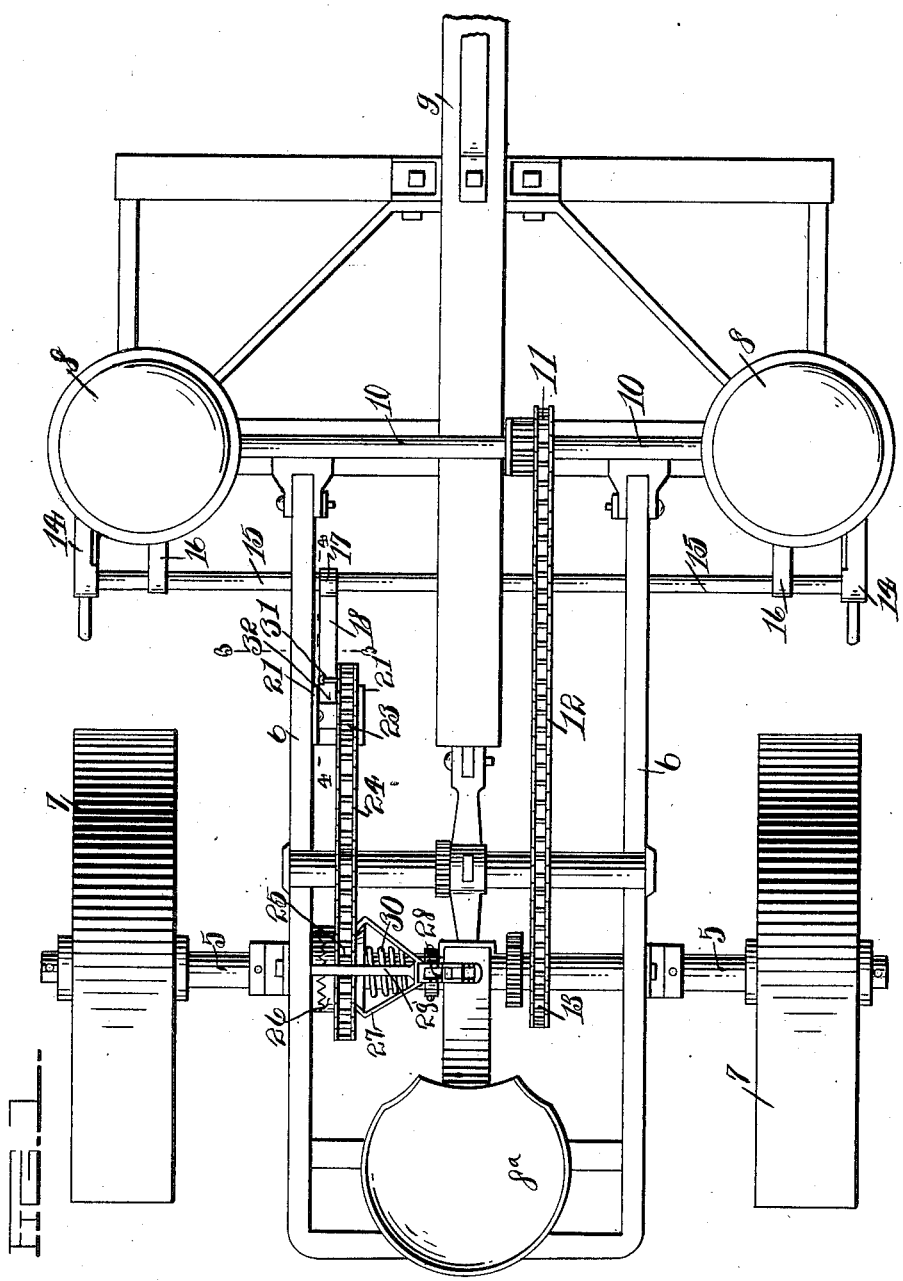
Witnesses
Inventor
Wardner N. Corbit
Attorneys.

W. N. CORBIT.
WIRELESS CHECK ROWER.
APPLICATION FILED OCT. 12, 1910.
1,029,595.
Patented June 18, 1912.
2 SHEETS—SHEET 2.
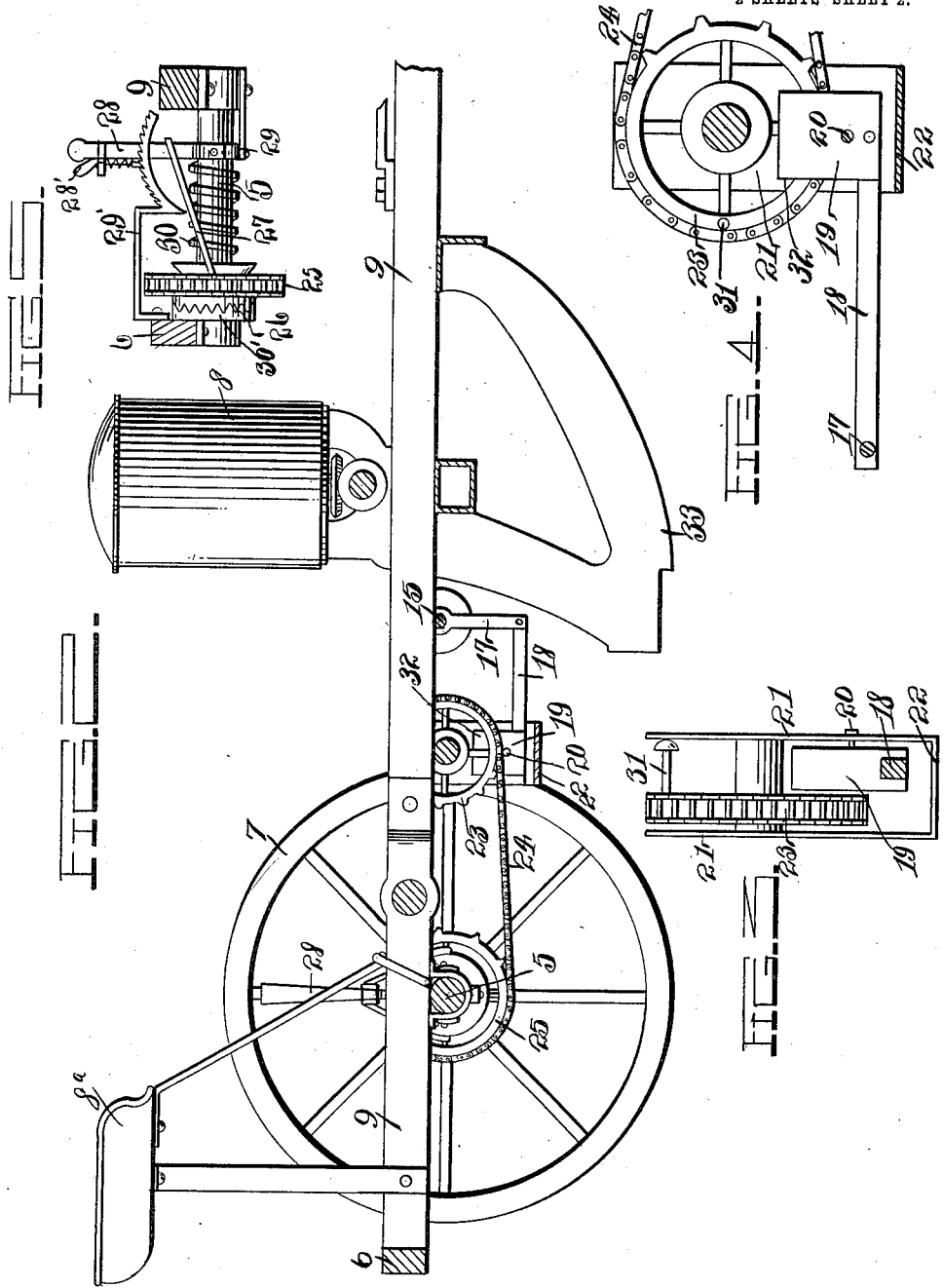
Witnesses
J. N. Taylor.
Joseph J. O'Brien
Inventor
Wardner N. Corbit,
by Chandler & Chandler
Attorneys

UNITED STATES PATENT OFFICE.

WARDNER N. CORBIT, OF FARRAGUT, IOWA.

WIRELESS CHECK-ROWER.

1,029,595.  Specification of Letters Patent.  Patented June 18, 1912.

Application filed October 12, 1910. Serial No. 586,762.

*To all whom it may concern:*

Be it known that I, WARDNER N. CORBIT, a citizen of the United States, residing at Farragut, in the county of Fremont, State of Iowa, have invented certain new and useful Improvements in Wireless Check-Rowers; and I do hereby declare the following to be a full, clear, and exact description of the invention, such as will enable others skilled in the art to which it appertains to make and use the same.

This invention relates to improvements in planters and the leading object in view is to provide an automatic trip mechanism of an improved character for planters whereby the ground or traction wheels will operate the seed valves.

With the above and other objects in view the invention consists in certain constructions, combinations, and arrangements of parts, clearly described in the following specification and clearly illustrated in the accompanying drawings in which:—

Figure 1 is a plan view of a planter showing the application of the trip mechanism. Fig. 2 is a longitudinal sectional view thereof. Fig. 3 is a detail sectional view taken on the line 3—3 of Fig. 1. Fig. 4 is a detail sectional view taken on the line 4—4 of Fig. 1. Fig. 5 is a detail of the clutch lever.

Referring to the accompanying drawings 5 denotes the axle which is journaled to the frame 6 and on which ground or traction wheels 7 are mounted. A suitable seat 8ª is fixed to the rear end of the frame and a draft beam 9 fixed to the forward end of the frame. On the forward end of the frame 6 seed boxes 8 are mounted. The seed boxes 8 are provided with suitable seed agitators, arranged therein, not shown, which are operated through the medium of the shaft 10 arranged transversely on the frame 6. The shaft 10 is provided with a sprocket 11 over which a chain 12 is trained and said chain 12 is also trained on a sprocket 13 mounted on the shaft 5. Bracket arms 14 are fixed on the sides of the frame 6 near the seed boxes 8 and a rock shaft 15 is journaled on said bracket arms. The rock shaft 15 is connected by means of crank arms 16 with the seed valves of the boxes 8 and intermediate of the ends of said rock shaft 15 a depending crank arm 17 is fixed. The lower end of the crank arm 17 is pivotally connected to the horizontal and forwardly extending arm 18 of the trip lever 19 which is pivoted at 20 to the side walls 21 of the U-shaped bracket 22. The U-shaped bracket 22 is mounted by its inner side wall against the frame 6 and between said side walls 21 a sprocket wheel 23 is journaled. The sprocket wheel 23 has a chain 24 engaged thereon and said chain also operates over a sprocket wheel 25 mounted on a clutch element 26. The clutch element 26 is loose on the axle 5 and is connected to the spanner arms 27 of the lever 28, which is pivoted on a supporting arm 29 suitably secured to the frame 6. A coil spring 30 is mounted on the axle 5 and is adapted to hold the clutch element 26 against the clutch element 30' which is fixed to said axle 5. The sprocket wheel 23 carries a small pin 31 which is adapted to engage the upper end 32 of the trip lever 19 whereby the forward end of the arm 18 will be moved upwardly so as to rock the shaft 15 and operate the seed valves. The usual shoes 33 are arranged beneath the seed boxes 8 to receive the seed therefrom.

When the clutch element 26 is engaged with the clutch element 30' and the axle 5 is rotated the pin 31 of the sprocket wheel 23 will engage the trip lever 19 and rock the operating shaft 15 whereby the seed valves in the seed boxes 8 will be actuated.

The trip mechanism shown is exceedingly simple in construction and can be applied with possibly slight variations to practically all types of planters in use.

The lever 28 is provided with a clutch pawl 28' which engages the rack 29', supported on the frame 6.

What is claimed is:—

In a planter, a frame, seed boxes mounted on the frame and provided with means for releasing the seed therefrom, arms extending rearwardly from the seed boxes and connected with the releasing means thereof, a rock shaft journaled on the frame and connected to the rear ends of the arms, a crank arm rigid with the rock shaft and depending therefrom at one side of the frame, a U-shaped bracket having one of its side walls secured to the frame and depending therefrom, a trip lever having an enlarged upwardly extending head pivotally mounted between the side walls of the bracket and a reduced forwardly extended arm pivoted to the depending crank arm, a sprocket rotatably mounted between the side walls of the bracket, a pin projecting from the sprocket to engage the forward upper portion of the lever and move the forwardly extended arm upwardly, a wheeled axle journaled to the rear end of the frame, a sprocket wheel mounted on said axle, a sprocket chain engaged around the said sprocket wheels, means normally keying the sprocket wheel to the axle for rotating the pin carrying sprocket wheel and means for disengaging the latter means.

In testimony whereof, I affix my signature, in presence of two witnesses.

WARDNER N. CORBIT.

Witnesses:
MABEL R. CORBIT,
EVA L. MILLER.

---

Copies of this patent may be obtained for five cents each, by addressing the "Commissioner of Patents, Washington, D. C."